United States Patent [19]

DesForges et al.

[11] Patent Number: 5,085,587

[45] Date of Patent: Feb. 4, 1992

[54] SCANNABLE FORM AND SYSTEM

[75] Inventors: Paul DesForges, San Dimas; Michael Prutz, Orange, both of Calif.

[73] Assignee: Scantron Corporation, Tustin, Calif.

[21] Appl. No.: 563,443

[22] Filed: Aug. 7, 1990

[51] Int. Cl.$^5$ ............................................. G09B 7/00
[52] U.S. Cl. .................................. 434/355; 434/353; 434/358; 434/363; 382/59
[58] Field of Search ................ 434/325, 353, 355, 356, 434/358, 362, 363; 382/48, 59; 358/96, 75; 340/706, 707, 708

[56] References Cited

U.S. PATENT DOCUMENTS

| | | | |
|---|---|---|---|
| 3,050,248 | 8/1962 | Lindquist | 434/355 |
| 3,443,348 | 2/1972 | Azure, Jr. | 434/363 |
| 3,793,472 | 2/1974 | Sternberg et al. | 434/363 |
| 3,900,961 | 8/1975 | Sokolski et al. | 434/363 |

Primary Examiner—Vincent Millin
Assistant Examiner—Joe H. Cheng
Attorney, Agent, or Firm—Spensley Horn Jubas & Lubitz

[57] ABSTRACT

A scannable form and system, the form containing a plurality of response control marks including response control marks for controlling the input of numeric values, and other mode selection indicia. A specific teaching of the invention is the use of numeric value blocks to input a numeric value, such as the result of a related test, which is then mathematically combined with the tallied result of a set of multiple response inputs, such as a multiple choice test, to obtain a total. The numeric value can also be used to weight different responses.

19 Claims, 5 Drawing Sheets

SCANNABLE FORM AND SYSTEM

BACKGROUND OF THE INVENTION

1. Field of the Invention

The present invention relates to machine scannable forms and systems, and more particularly to a scannable form combining multiple response inputs and numeric value inputs, and a system for scanning such a form.

2. Description of Related Art

Automatic scanning machines for scanning preprinted forms represent a time saving aid to the overburdened operator of such a device. The use of scanning machines in conjunction with such forms enables rapid monitoring of items and personnel, and permits more frequent record keeping or testing than might otherwise be considered if an operator had to check the forms manually. Such machines are frequently used to score scholastic test results, tally attendance data, and tally inventory, for example.

Current thinking among educators is that multiple choice tests alone are not sufficient to accurately assess the abilities and performance of students. More emphasis is being placed on related testing means, such as essays and the work supporting problem solutions in mathematics and science, used in conjunction with multiple choice tests to give a better measure of a student's capabilities.

Presently, machine scannable forms do not have the capability to combine a numeric value input, such as the score from a related test, with the results of tallied multiple response inputs, such as from a multiple choice test. Rather, operators of automatic scanning equipment must manually combine numeric values and the tally from multiple response inputs, which is both time consuming and presents an inherent risk of error. Accordingly, an object of the invention is to provide a scannable form that can combine one or more numeric values with the tally derived from multiple response inputs on the form.

A further difficulty in the scholastic testing area occurs when different students are to be held to different standards. For example, if the same test is given to multiple grade levels or more than once to some students, educators may want to provide a result for each student that takes into account that student's grade level or the number of times the test has been taken. Currently, operators of automatic scanning equipment must manually calculate a final result between the number of correct answers and some type of difficulty factor. Thus, an object of the invention is to provide a scannable form that allows for the input of a numeric value and a mathematical operation to be performed between the numeric value and the correct question response.

SUMMARY OF THE INVENTION

This and other objects are achieved by providing a scannable form and system, the form containing a plurality of response control marks including response control marks for controlling the input of numeric values, and other mode selection indicia. A specific teaching of the invention is the use of numeric value blocks to input a numeric value, such as the result of a related test, which is then mathematically combined with the tallied result of a set of multiple response inputs to obtain a total. The numeric value can also be used to weight different responses.

The form is used in conjunction with a scanning apparatus designed to interpret entries in the numeric value blocks as a numeric value.

The scannable form may use either a horizontal format, in which a fixed number of response receiving spaces are row aligned with each response control mark, or a vertical format, in which a single response receiving space is aligned with each response control mark. In the vertical format, the number of response choices per question is not fixed. A format mode selection mark (or the absence of such a mark) automatically conditions the scanner for vertical or horizontal operation.

The novel features which are believed to be characteristic of the invention, together with further objectives and advantages thereof, will be better understood from the following description considered in conjunction with the accompanying drawings. The drawings illustrate the presently preferred embodiment of the invention by way of example. It is to be expressly understood, however, that the drawings are for the purpose of illustration and description only, and are not intended as a definition of the limits of the invention.

BRIEF DESCRIPTION OF THE DRAWINGS

A detailed description of the invention will be made with reference to the accompanying drawings, wherein like numerals designate corresponding parts in the several figures.

DESCRIPTION OF THE PREFERRED EMBODIMENT

The following detailed description of the scannable form is of the best presently contemplated mode of carrying out the present invention. This description is not to be taken in a limiting sense, but is made merely for the purpose of illustrating one of the uses of the invention. Uses of the invention include scannable forms to aid in test scoring, recording of school attendance, inventory, or any other type of record keeping.

Figure 5:
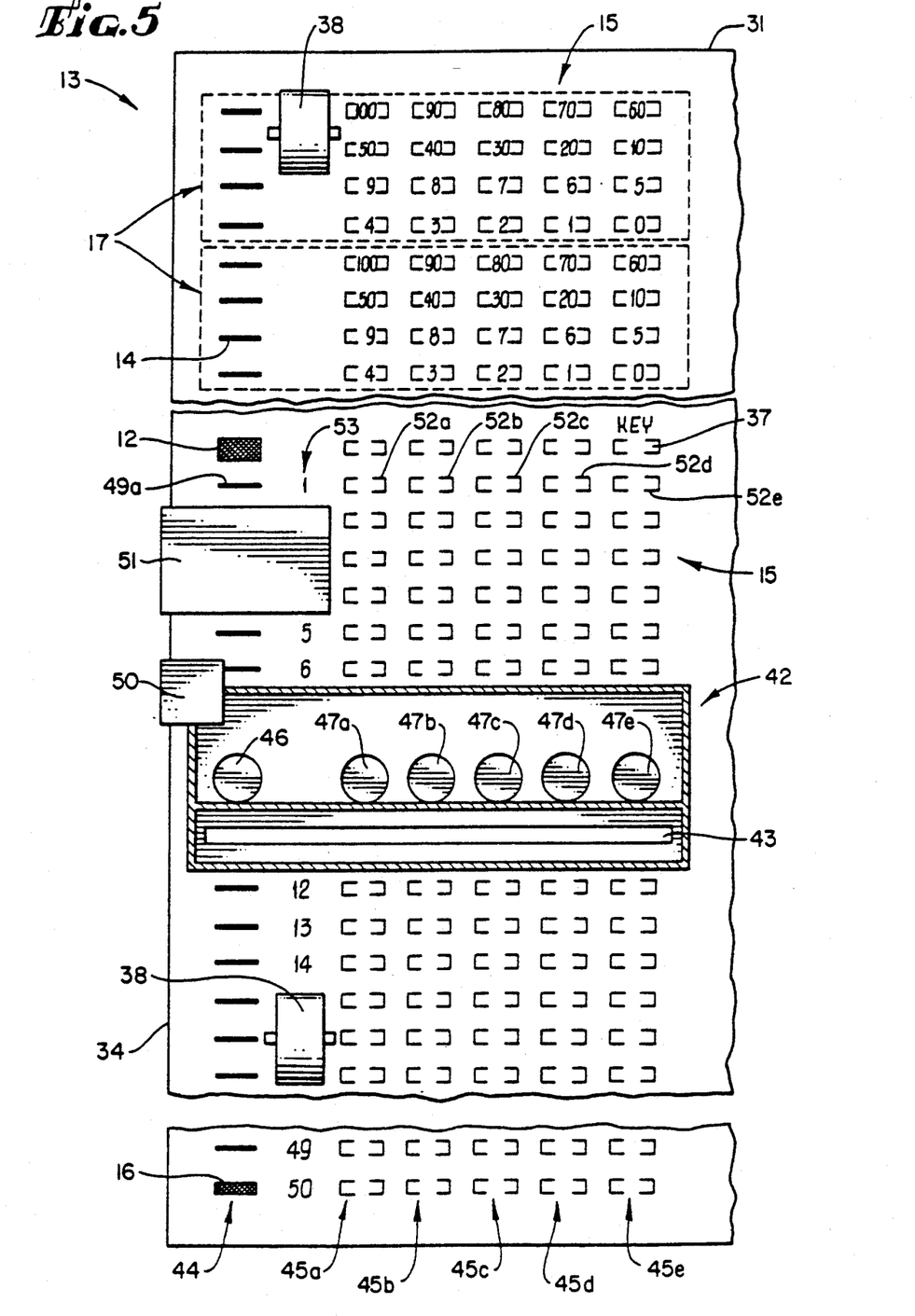
FIG. 5 shows the same mechanism as FIG. 4, as viewed along the line 3—3 thereof, with a scannable form in accordance with the present invention.
Figure 6:
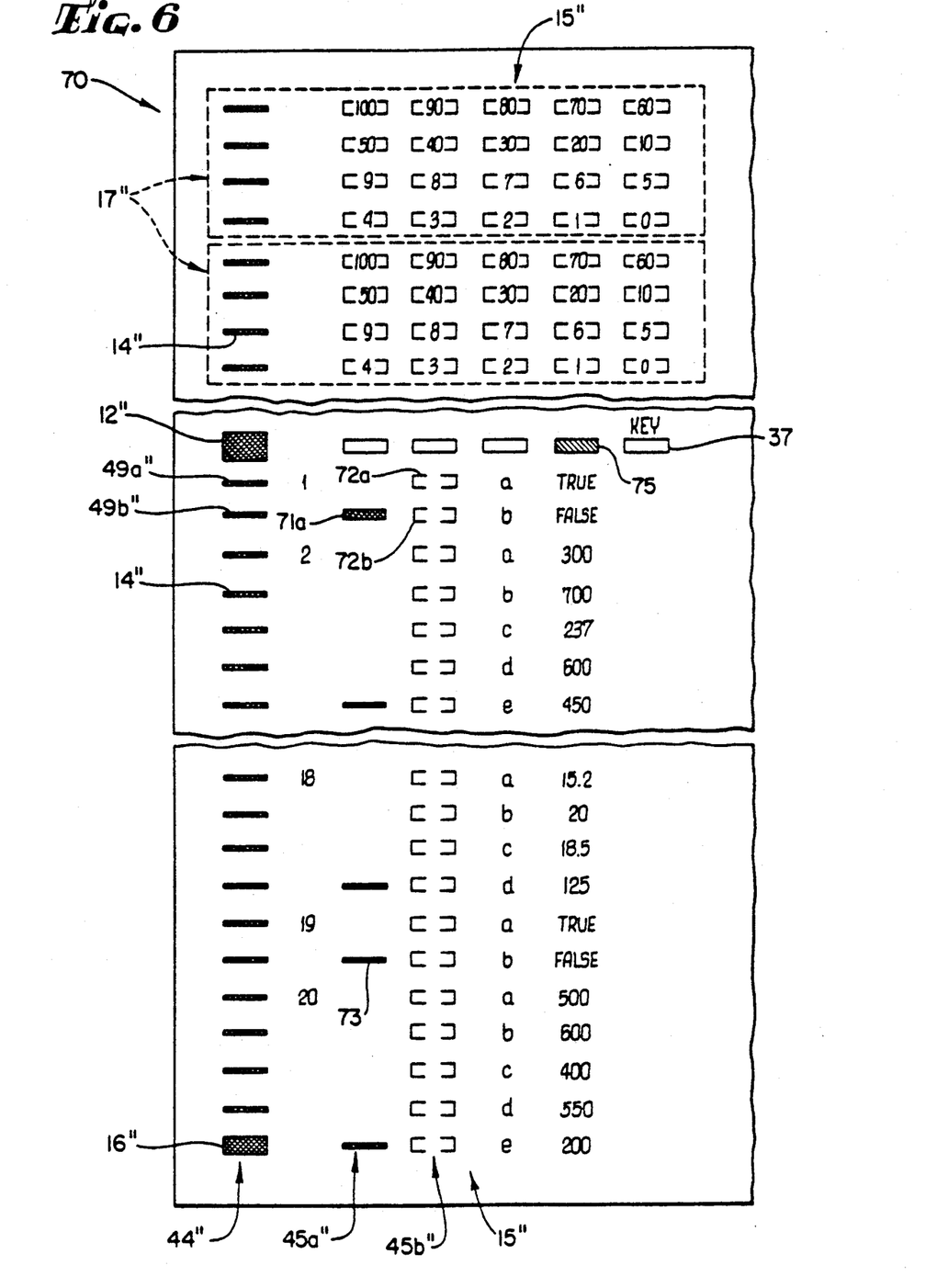
FIG. 6 shows a scannable form in accordance with the present invention, having a vertical format.

The form scanning apparatus 30 (FIG. 2) in accordance with the present invention is designed to scan a scannable form 13 having horizontal format (FIG. 3 and FIG. 5) or a scannable form 70 having a vertical format (FIG. 6). The scannable form 13 of the present invention is best understood with reference to a Scantron-type scannable form 13' (FIG. 1) of the prior art having a horizontal format. This prior art form is marketed by Scantron Corporation of Tustin, Calif.

Figure 2:
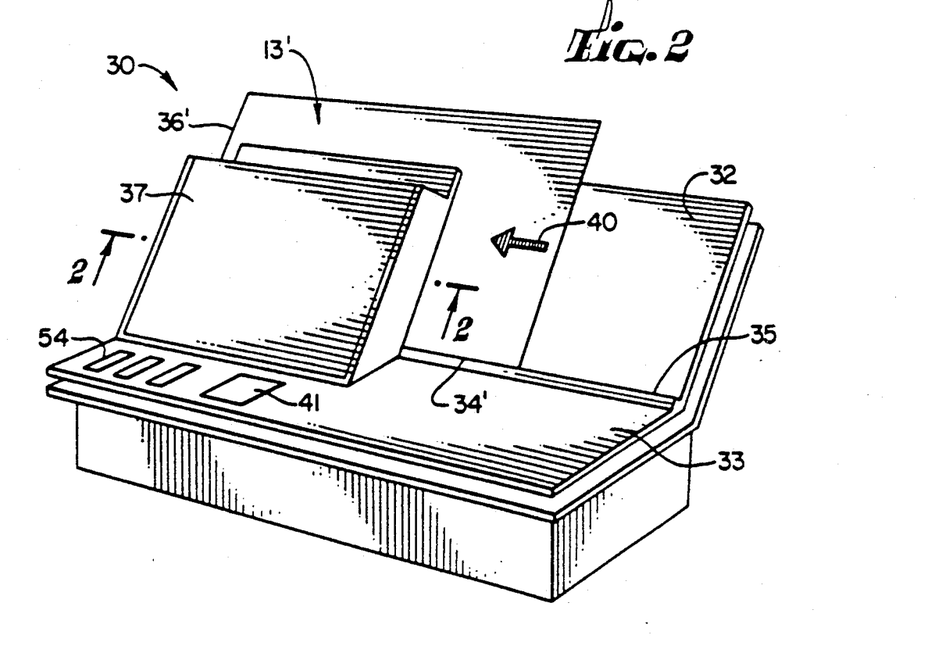
FIG. 2 is a perspective view of a form scanning apparatus in accordance with the present invention.

As shown in FIG. 2, the form 13' is placed face-up on a vertically inclined platen 32 provided on the apparatus housing 33. A longitudinal edge 34' of the form 13' rests on a ledge 35 at the bottom of the platen 32. The form leading edge 36' is inserted behind a reader housing 37 containing a pair of drive wheels 38, rotated by motor 39 (FIG. 4), which transports the form 13' at a predetermined rate in the direction of the arrow 40. As the form 13' is driven beneath the housing 37, each response is detected and marked. The total number of responses may appear on a display 41 and optionally may be printed on the form 13'. (When the form 13 is used to score tests, the number of correct responses may be displayed and printed). Alternatively, the tallied responses may be recorded in electronic form for further processing by another machine, or transmitted (e.g., by modem) to a central computer.

Figure 1:
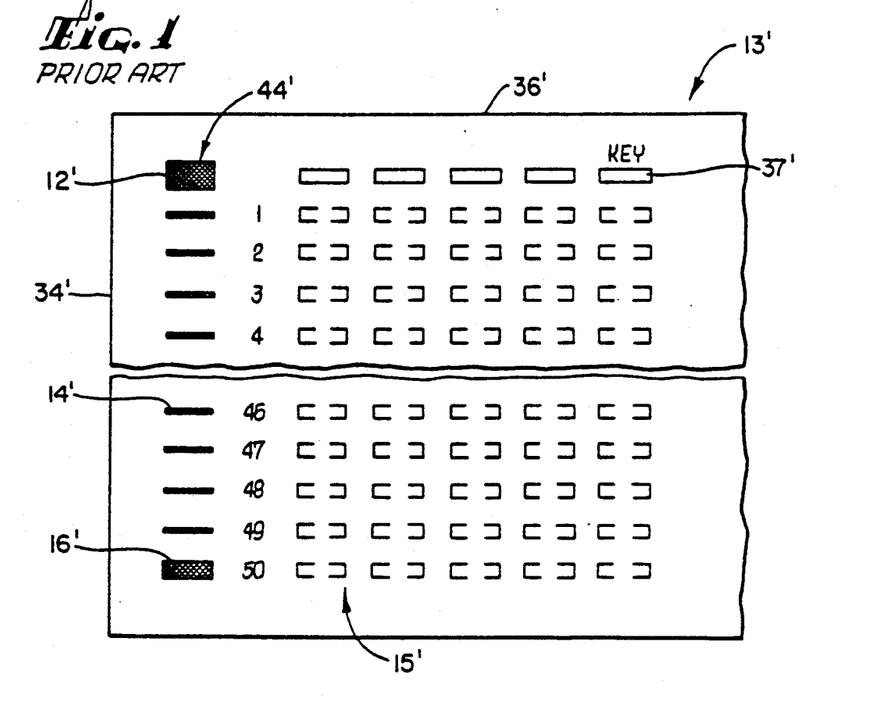
FIG. 1 shows a scannable form of the prior art, having a horizontal format.

As shown in FIG. 1, the Scantron-type scannable form of the prior art has a start-of-form mark 12', multiple response control marks 14', and an end-of-form mark 16'. These marks 12', 14' and 16' are aligned in a control mark column 44' which is parallel to the longitudinal form edge 34' of the form 13'. Detection of the start-of-form mark 12' by the form scanning apparatus 30 automatically initiates scanning of the form 13'. Each of the response control marks 14' is row aligned with one or more response spaces 15'. Responses are indicated by marking an opaque mark within a response space 15'.

If a test is being scored, detection of a response control mark 14' enables appropriate circuitry to compare a response entered in a response receiving space 15' aligned with that response control mark 14' with corresponding correct answer data stored in a memory. In other applications, responses entered in response spaces 15' are tallied. The end-of-form mark 16', the last mark in the control mark column 44', enables score or tally printout, or triggers data storage or transmission. Both the start-of-form mark 12' and the end-to-form mark 16' can act as response control marks.

It should be noted that the present invention is not limited to use with forms having a start-of-form mark 12' and/or an end-of-form mark 16'.

Figure 4:
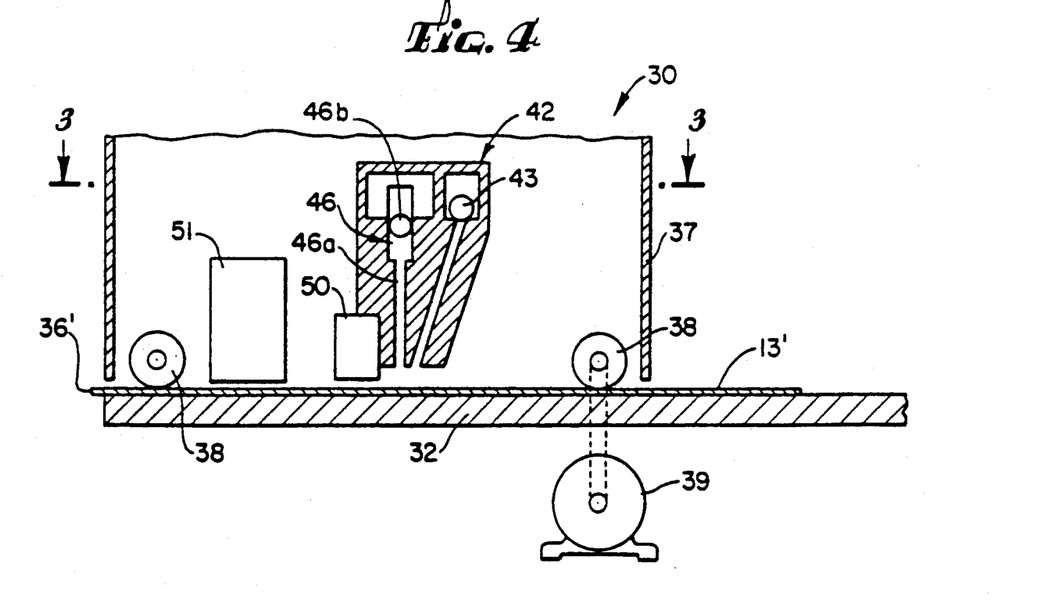
FIG. 4 is a diagrammatic view of one of the drive, sensing, error marking and tally printing mechanisms of the form scanning apparatus in accordance with the present invention, all as seen along the line 2—2 of FIG. 2.

FIG. 4 shows a diagrammatic view of the form scanning apparatus 30 as seen along the line 2—2 of FIG. 2. To tally data, the form 13' is transported past a read station 42 containing at light source 43 which illuminates both the control mark column 44' and the response receiving spaces 15' of the form 13'. The read station 42 also includes a control channel sensor 46 which detects control marks in the control mark column 44', and a plurality of data channel sensors 47a through 47e (FIG. 5) which detect responses in the spaces 15'.

The control channel sensor 46 may comprise a light guide 46a, a photosensor 46b, and an associated amplifier (not shown) which provides an output signal when a control mark is sensed by a reduction in the light level reflected from the form 13'. Similarly, the data channel sensors 47a–47e each may comprise a light guide, a photosensor, and an associated amplifier providing respective, parallel outputs. The data channel sensors 47a–47e are row aligned with the control channel sensor 46.

The scanning apparatus may also include an error marking device 50 for marking erroneous responses, and a score printer 51.

Figure 3:
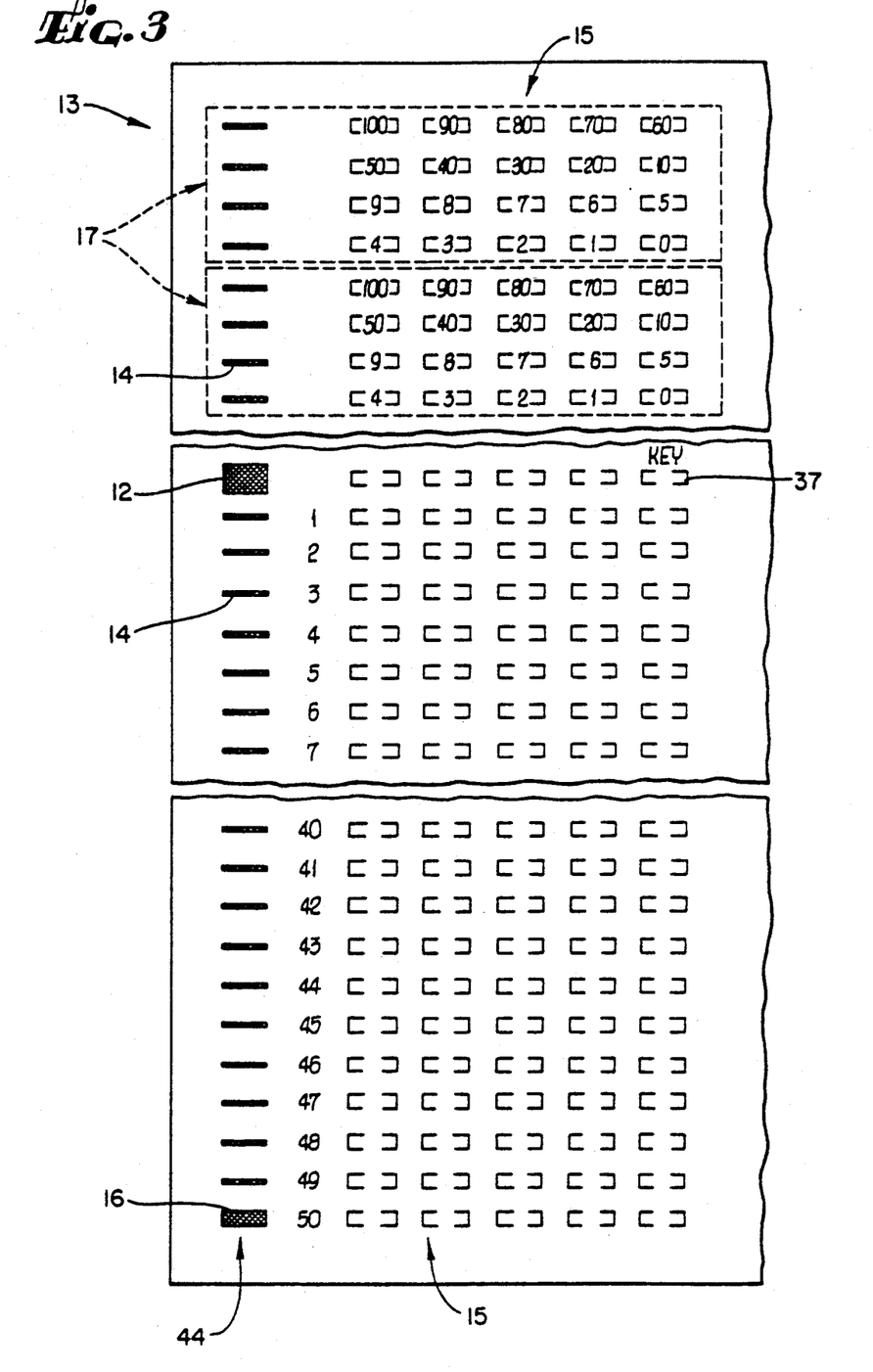
FIG. 3 shows a scannable form in accordance with the present invention, having a horizontal format.

FIG. 3 shows the scannable form 13 of the present invention having a horizontal format. If used with a Scantron-type scanner, the form 13 has a start-of-form mark 12 and an end-of-form mark 16 in a control mark column 44. However, the form 13 has response control marks 14 both above and below the start-of-form mark 12. Shown above the start-of-form mark 12 are multiple numeric value blocks 17 which each contain a number of response control marks 14 and associated row aligned response receiving spaces 15. In the preferred embodiment, the numeric value blocks 17 are located above the start-of-form mark 12. However, the numeric value blocks 17 can be located below the start-of-form mark 12 or in any location within the bounds of the form 13. As explained below, numeric values can be entered in each of the numeric value blocks 17. Below the start-of-form mark 12 are multiple rows of response control marks 14 with their associated row aligned response receiving spaces 15. These response control marks 14 allow for entering answer to test questions in scholastic tests, tally information in inventory control, or the input of other types of data.

Figure 3A:
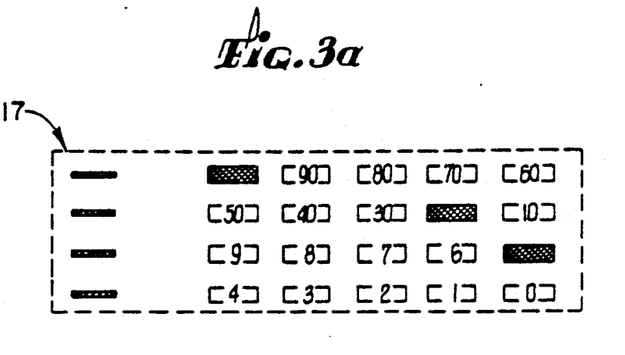
FIG. 3a is an example of a numeric value input for a numeric value block of the scannable form of the present invention.

In a numeric value block 17, each response receiving space 15 is marked with a number which determines the weighting for that response receiving space 15. The response receiving spaces 15 in each numeric value block 17 are added according to the weighting factors in order to obtain a sum representing an associated numeric value for the numeric value block 17. For example, the response receiving spaces 15 of the numeric value block 17 marked as shown in FIG. 3a correspond to weights of "100", "20", and "5". Thus, the numeric value associated with the block 17 is "125".

The form scanning apparatus 30 is programmed to interpret the opaque marks in a numeric value block 17 of the form 13 as a numeric value by marking the corresponding numeric value block 17 on a "key" sheet. The "key" sheet allows entry of this numeric value block 17 information and other information including the appropriate responses for other response receiving spaces 15 and the type of result reporting that is desired. In addition to marking the "key" sheet, a program switch 54 on the form scanning apparatus 30 must be momentarily closed before feeding the "key" sheet into the apparatus 30. If the program switch 54 is not closed, data entry is inhibited even though a "key" sheet is present. In the preferred embodiment, the "key" sheet is identified by marking the key space 37, which is the response receiving space 15 that is farthest from the start-of-form mark 12 in the row containing the start-of-form mark 12.

The numeric value marked by the operator on the "key" sheet both allows a numeric value to be entered in the associated numeric value block 17 on a form 13 and assigns a maximum value to this numeric value. Each numeric value maximum from the "key" sheet is stored in an addressable memory. If the numeric value maximum for any numeric value block 17 is present on the "key" sheet, the form scanning apparatus 30 is conditioned to read the associated response receiving spaces 15 for that numeric value block 17 on the form 13 being scanned in order to obtain the numeric value input. If no numeric value maximum is marked on the "key" sheet for a numeric value block 17, the form scanning apparatus 30 is conditioned not to read the response receiving spaces 15 for the associated numeric value block 17 on the form 13 being scanned.

For example, where an educator is administering both a multiple choice test and a related test, such as an essay, the educator would mark the numeric value block 17 on the "key" sheet with the numeric value maximum, which is the total possible points for the related test. Thus, the form scanning apparatus 30 would be conditioned to read the response receiving spaces 15 for the associated numeric value block 17 on the form 13 being scanned to obtain the numeric value input for that form 13. If the educator is not administering a related test, the numeric value block 17 on the "key" sheet would not be marked, and the form scanning apparatus 30 would not read response receiving spaces 15 for the associated numeric value block 17 on the form 13 being scanned. If a numeric value input from the form 13 being scanned is more than the associated numeric value maximum, an error condition exists. The form scanning apparatus 30 can be programmed to handle error conditions in different ways.

The remaining response receiving spaces 15 allows entry of question or tally responses. On a form 13 with a horizontal format, each response is marked in a response receiving space 15 aligned with a response control mark 14. When the form 13 is used for testing purposes, correct responses are received from the "key" sheet and are stored in the addressable memory along with any maximum numeric values. When such a form 13 is read by the form scanning apparatus 30, the absence of a "key" mark automatically conditions the form scanning apparatus 30 not to store new correct responses.

In a testing mode, the form scanning apparatus 30 compares each entered response to the response read-in from the "key" sheet and obtains a correct response sum. If the form 13 that is scanned has response receiving spaces 15 on both sides of the sheet, the apparatus 30 will add to correct responses on both sides of the sheet to obtain the correct response sum. In the preferred embodiment, each numeric value input for a numeric value block 17 that has an assoicated maximum value on the "key" sheet is added to this response sum to obtain a total. For example, where an educator has administered both a multiple choice and a related test, the correct response sum, corresponding to the total correct answers for the multiple choice test, is added to the numeric value input, corresponding to the score from the related test, to obtain a total overall score for the two tests.

Alternatively, the scannable form 13 or the form scanning apparatus 30 can include one or more function inputs for indicating the appropriate mathematical function to be performed using the correct response sum and the numeric value input. For example, the form scanning apparatus 30 could include one or more input switches to allow the operator of the apparatus 30 to indicate the appropriate mathematic function to be performed or the form 30 could include one or more response receiving spaces 15 for the "key" sheet to indicate the mathematic function. The mathematical function to be performed can include, but is not limited to, addition, subtraction, multiplication, division, or a combustion thereof. For example, a numeric value input entered into a numeric value block 17 can be used as a multiplication weighting factor, so that each student taking a test can be individually considered to take into account skill or age level, previous times tested, etc. A weighting factor can also be used to weight wrong answers differently from right answers, to penalize guessing. Further, different numeric value blocks 17 can be used on one form to indicate that associated questions are to be weighted differently from other questions.

In a non-testing, or tallying, mode, a "key" sheet need not define correct responses, but would instead define categories and multiple response values. For example, if a form 13 is used for inventory control, each response control mark 14 can be defined to represent a particular inventory item, and the response spaces 15 can be defined as inventory counts or ranges. When the form 13 is scanned, marks in the response spaces 15 are tallied for each inventory item.

Considerable flexibility is permitted with respect to how many of the response controls marks 14 and associated response spaces 15 on a form 13 are actually used. That is, fewer question or tally response or numeric value inputs may be called for than are available on a pre-printed form. If no response or numeric value is stored in the memory location associated with a particular response control mark 14 when the "key" sheet is read-in, that response or numeric value is ignored when the form 13 is scanned. Furthermore, the present invention permits multiple sheet forms 13 to be used. Page marks or other means may be used to indicated which page of the form 13 is currently being scanned.

The numeric value blocks 17 operate identically with either a form 13 having a horizontal format, or a form 70 having a vertical format. However, the scanning of the tally or question responses is different with each format. FIG. 5 shows the form scanning apparatus 30 as viewed along the line 3—3 of FIG. 4, with a scannable form 13, having a horizontal data format. With a horizontal format, a single response control mark 14 is assoicated with each tally item or question. The tally items or questions themselves may be identified by numbers printed in a column 53.

For each tally item or question on the form 13, one or more (here, five) response receiving spaces 15 are row aligned with the corresponding response control mark 14. Thus, for item 1 of FIG. 5, the response receiving spaces 52a-52e are aligned with the response control mark 49a. To respond to item 1, an opaque mark is entered in one of the response spaces 52a-52e corresponding to the selected response. Such response marks are detected by the control channel sensors 47a-47e which are positioned over the respective response columns 45a-45e.

In the vertical format of FIG. 6, the scannable form 70 has a control mark column 44" like that of the form 13 in FIG. 5. However, several response control marks 14" are associated with each item or question. The response receiving spaces 15" all are situated in a single column 45b" detected by the data channel sensor 47b. End-of-item marks 73 may be provided in a column 45a" aligned with the sensor 47a to indicate the end of each item or question. Thus, in FIG. 6, question #1 includes two response receiving spaces 72a and 72b row aligned with the respective answer control marks 49a" and 49b". An end-of-item mark 71a aligned with the response control mark 49b" indicates that the response space 72b is the last response space associated with question #1.

The scanning apparatus 30 scans the form 70 having a verical format in a manner similar to that for the form 13 having a horizontal format. In the preferred embodiment, the circuitry of the apparatus is enabled to scan the vertical fomat by detection of a vertical space 75 that has been marked with an opaque mark. The vertical space 75 is row aligned with the start-of-form mark 12"

and column aligned for detection by the data channel sensor 47d. Absence of a marked vertical space 75, as on the form 13, causes the apparatus 30 to score or tally in the horizontal mode. Of course, other means, such as a manual switch, may be used to enable the scanning apparatus 30 to score or tally in one or the other of these modes.

Provisions are made for the form scanning apparatus 30 to mark on the form 13 or the form 70 each incorrect response, the correct response next to the incorrect response, the total number of correct responses, the percentage of correct responses, the total number of incorrect responses, the result obtained from the operation of the numeric value input on the total of the correct responses, and the average of this result. Other types of responses may be provided as necessary for particular applications. For example, the form scanning apparatus 30 may provide for printing a roster of scores on a sheet used to post such scores.

The form scanning apparatus 30 can print the marks on the bottom of the first side of the form 13 or the form 70, or on the second side of a two-sided form 13 or form 70. The apparatus 30 may also operate in a "re-scan" mode where the marks to be printed on the form 13 or the form 70 are offset. In this mode, a form 13 or a form 70 can be scanned a second time, such as after a confusing question has been eliminated.

One preferred embodiment of the present invention has been illustrated and described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. A scannable form combining multiple response inputs and numeric value inputs, the form having:
   a. an elongate rectangular shape with first and second generally straight longitudinal edges;
   b. at least one response column parallel to the first longitudinal edge;
   c. a single control mark column, parallel to the first longitudinal edge and parallel to the response column but spaced therefrom, the control mark column containing, in a direction parallel to the first longitudinal edge:
      (1) a first set of response control marks having a first length;
      (2) a second set of response control marks having the first length;
      (3) a start-of-form mark having a second length different from the length of the response control marks; and
      (4) an end-of-form mark having a third length different from the length of the response control marks and from the length of the start-of-form mark;
   the first set of response control marks being column aligned with start-of-form mark and before the second set of response control marks, the start-of-form mark being column aligned before the second set of response control marks, and the second set of response control marks being column aligned before the end-of-form mark; and
   d. a response row corresponding to each response control mark, each response row being row aligned with the corresponding response control mark perpendicular to the first longitudinal edge, each response row containing at least one response receiving space, and each response receiving space being aligned in said at least one response column; wherein the first set of response control marks and associated response rows are organized into at least one numeric value block for indicating a numeric value, and wherein each numeric value block includes at least one response control mark and associated response row.

2. The form of claim 1, wherein all of the lengths are measured in a direction parallel to the first longitudinal edge, and the start-of-form mark is longer than the end-of-form mark, and the end-of-form mark is longer than the response control marks.

3. The form of claim 1 wherein each response row of a numeric value block contains a plurality of response receiving spaces each designated to correspond to a different numeric value.

4. The form of claim 3 wherein the numeric value for a numeric value block is designated to correspond to the sum of the numeric values of all selected response receiving spaces within the numeric value block.

5. The form of claim 4 further including means for designating a form as a "key" form such that each numeric value of each numeric value block on the "key" form indicates that the associated numeric value block on subsequent forms should contain a numeric value and indicates the maximum value for the associated numeric value.

6. The form of claim 1 wherein each response row associated with the response control marks of the second set of response control marks contains a plurality of response receiving spaces designated to correspond to selectable answers of a multiple choice question.

7. The form of claims 4 and 6 further including means for designating a mathematical operation to be performed between the numeric value of a numeric value block and the sum of the response receiving spaces.

8. The form of claim 7 wherein the designated mathematical operation is the operation of addition in the absence of a selected operation.

9. The form of claim 1 wherein the end-of-form mark is aligned with a corresponding response row.

10. The form of claim 1 wherein each response row associated with the response control marks of the second set of response control marks contains only one response receiving space in a corresponding response column, at least one group of successive response rows being allocated to correspond to selectable responses, and further comprising an end-of-response column parallel to the first longitudinal edge but spaced from both the control mark column and the response column and containing marks row aligned with the last response space associated with each group of response rows.

11. The form of claim 1 further comprising a set of mode indicating indicia row aligned with the start-of-form mark and column aligned with at least one of the response columns.

12. A form scanning system including:
    a. a scannable form having:
       (1) an elongate rectangular shape with first and second generally straight longitudinal edges;
       (2) at least one response column parallel to the first longitudinal edge;
       (3) a single control mark column, parallel to the first longitudinal edge and parallel to the response column but spaced therefrom, the control mark column containing, in a direction parallel to the first longitudinal edge:
(i) a first set of response control marks;
(ii) a second set of response control marks;
(iii) a start-of-form mark; and
(iv) an end-of-form mark;
the first set of response control marks being column aligned with the start-of-form mark and before the second set of response control marks, the start-of-form mark being column aligned before the second set of response control marks, and the second set of response control marks being column aligned before the end-of-form mark; and (4) a response row corresponding to each response control mark, each response row being row aligned with the corresponding response control mark perpendicular to the first longitudinal edge, each response row containing at least one response receiving space, and each response receiving space being aligned in said at least one response column;

wherein the first set of response control marks and associated response rows are organized into at least one numeric value block for indicating a numeric value, and wherein each numeric value block includes at least one response control mark and associated response row; and b. scanning apparatus, for use with the scannable form, for scanning a numeric value block and interpreting response in the response rows of the numeric value block as a numeric value.

13. The form scanning system of claim 12, wherein the scanning apparatus is programmed by a key sheet to interpret the response rows associated with the first set of response control marks as a numeric value.

14. The form scanning system of claim 12, wherein the scanning apparatus is programmed to tally responses in the response rows associated with the second set of response control marks, and to mathematically combine the numeric value with the tally results.

15. The form scanning system of claim 12, wherein the scanning apparatus is programmed to mathematically combine the numeric value with selected responses in the response rows associated with the second set of response control marks.

16. A method for tallying data by using a scannable form combining multiple response inputs and numeric value inputs, the form having an elongate rectangular shape with first and second generally straight longitudinal edges, at least one response column parallel to the first longitudinal edge, a single control mark column parallel to the first longitudinal edge and parallel to the at least one response column but spaced therefrom in a direction parallel to the first longitudinal edge, the control mark column having a first set of response control marks being column aligned with a start-of-form mark and before a second set of response control marks, and the second set of response control marks being column aligned after the start-of-form mark and being column aligned before a end-of-form mark, and a response row being row aligned with a corresponding response control mark and perpendicular to the first longitudinal edge, each response row containing at least one response receiving space, and each response receiving space being aligned in said at least one response column, wherein the first set of response control marks and associated response rows are organized into at least one numeric value block for indicating a numeric value; wherein said method includes the steps of:

a. marking selected response inputs of the scannable form with data to be tallied;
b. marking selected numeric value inputs of the scannable form to represent at least one numeric value;
c. scanning the scannable form to detect responses to the response inputs;
d. scanning the scannable form to detect the value of at least one numeric value input; and
e. providing the result of a mathematical operation between selected response and the at least one numeric value input.

17. The method for tallying data of claim 16, further including the step of:
a. providing key data indicating acceptable responses for the response inputs.

18. The method for tallying data of claim 16 further including the steps of:
a. scanning the scannable form to detect the total number of responses to the response inputs; and
b. providing the result of a mathematical operation between the total number of responses and the at least one numeric value input.

19. The method for tallying data of claim 18, further including the step of:
a. providing key data indicating acceptable responses for the response inputs.

* * * * *